UNITED STATES PATENT OFFICE.

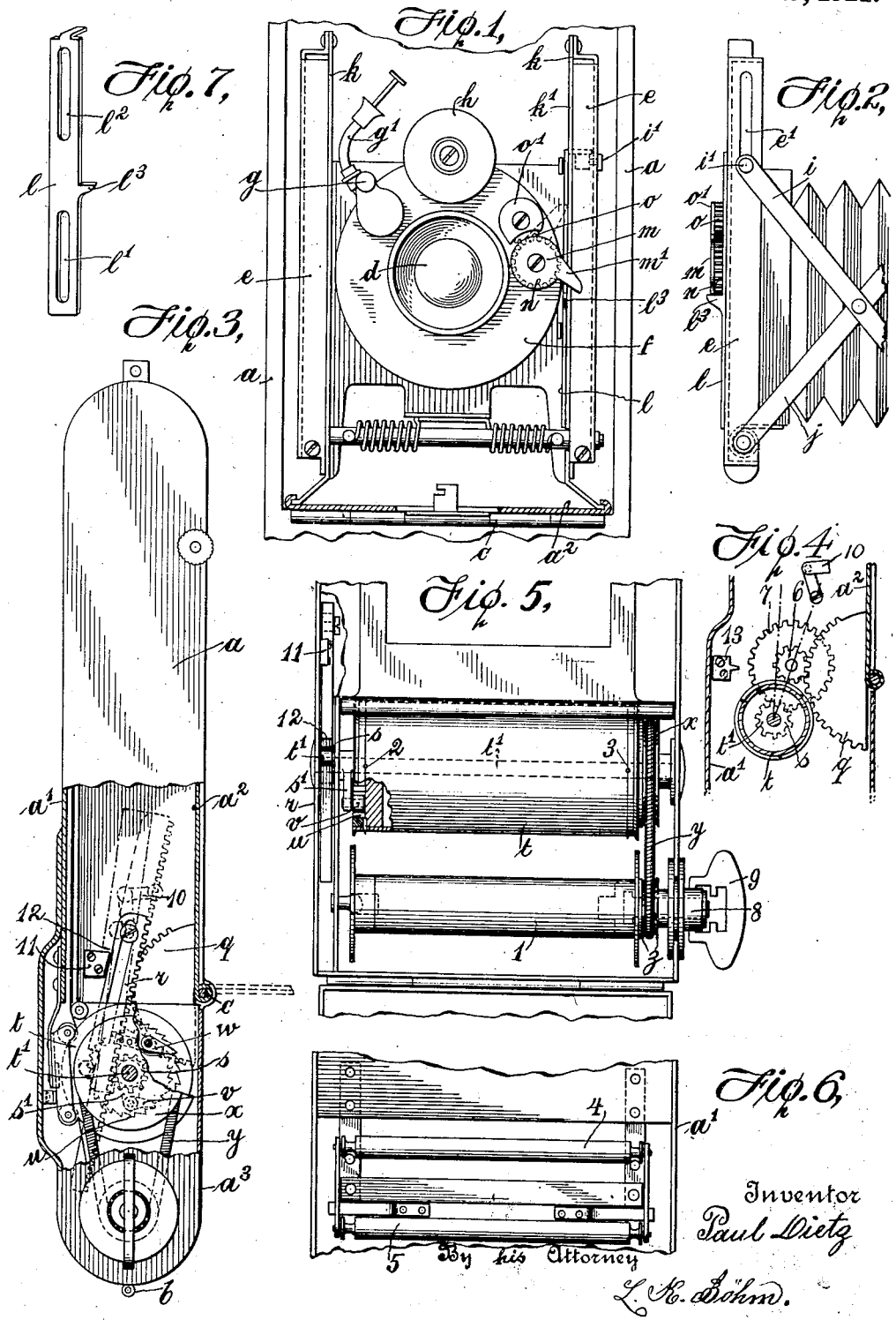

PAUL DIETZ, OF PHILADELPHIA, PENNSYLVANIA.

PHOTOGRAPHIC CAMERA.

1,372,803.  Specification of Letters Patent.  Patented Mar. 29, 1921.

Application filed December 22, 1916. Serial No. 138,336.

*To all whom it may concern:*

Be it known that I, PAUL DIETZ, a citizen of the United States, and a resident of Philadelphia, county of Philadelphia, State of Pennsylvania, have invented certain new and useful Improvements in Photographic Cameras, of which the following is a specification.

This invention has reference to improvements in photographic cameras for films. It pertains particularly to a camera in which the devices for tensioning the shutter and for moving a new film portion before the lens are automatically actuated in a novel, simple and precise manner.

The present invention is preferably applied to that type of cameras which are opened automatically when a button protruding beyond one side of the camera is pressed or pushed in. The front door then goes down and the objective plate with the objective thereon is automatically moved into the right position for taking a picture. When the picture has been taken the closing of the camera is initiated by moving in the objective whereby the shutter is tensioned for the next exposure and finished preferably by closing of the front door, whereby the exposed film is wound up and a new film portion is moving in that field.

The camera can be operated automatically or in the old way, the shutter can be tensioned, and the film winding mechanism can be operated by hand independently, for instance, when a new film is to be inserted or the exposed film is to be taken out.

Under certain circumstances it may be desirable to close the door without taking pictures, for instance, when a moving object disappears too quickly. Then the film winding device will be released by pressing a button or lever.

The film winding device is turning in but one direction and is provided with means to give a steady movement of the film without slipping. By moving in the objective the shutter is tensioned each time in a uniform manner and the effect of tensioning the shutter is the same no matter whether it is a focus for a long or short distance because a sliding bar or slide with nose moves certain mechanism for tensioning the shutter every time up to the same height whereby the usual tensioning device is uniformly actuated. Accordingly the importance of the slide rests in its predetermined end position.

When the front door has moved down by pressing the side button herein mentioned and the objective has moved out and is in position for taking a picture the only thing required is to release the shutter by hand or by means of the cable release and the picture then is taken. If the objective is pushed back into the camera the shutter becomes tensioned by the upward movement of the sliding bar with nose.

The movement of the film is effected by the movement of the front door, preferably while the door is being closed. After the objective has been pushed in the front door is closed.

In order to render the invention entirely clear reference is had to the accompanying drawing in which:

Figure 1 represents in front elevation the open camera with the top and bottom portions broken away, embodying in desirable form the present improvements.

Fig. 2 is a detail view of the tensioning device.

Fig. 3 illustrates the camera in side elevation with the lower part in section, showing the film moving mechanism.

Fig. 4 is a detail view of a modified form of film moving mechanism.

Fig. 5 illustrates in rear elevation partly broken away the film rolling device with the rear door of the camera opened.

Fig. 6 is a detail view of the film guide rollers for retaining the film on the drum.

Fig. 7 is a detail view of the shutter tensioning slide.

Similar characters of reference denote like parts in all the figures.

In the drawing $a$ represents the casing which consists of a rear section or door $a^1$, the front door $a^2$ and a rigid section $a^3$ below the front door. The rear door swings on the hinge $b$ at the bottom of the casing and the front door swings on the hinge $c$ mounted at its bottom end adjoining the rigid section $a^3$. Within the casing the entire mechanism is mounted. In Fig. 1 of the drawing the camera is shown opened and the front door $a^2$ is down. The objective or lens $d$ connected with the shutter $f$ on the objective plate $k$ then has moved automatically into the right position for taking a picture. The shutter $f$ is released by a hand operated lever $g$ or a cable release $g^1$ in the usual manner. The shutter shown represents a segment shutter but any other kind of shutter may be used. When a picture has been taken the camera is closed. First the objective is moved in with the lazy tongs device composed of an arrangement of bars $i, j$ similar to toggle levers. The lever $i$ has on its end a pin $i^1$ extending through a slot $e^1$. The bar $e$ is connected with the front standard $k$ which has a similar slot $k^1$ coincident with the slot $e^1$. While moving in the objective the shutter is tensioned in a novel manner. A slide bar $l$ having slots $l^1, l^2$ is moved up by the inward movement of the objective. A nose $l^3$ provided nearly in the middle of the slide bar then pushes up an extension $m^1$ of a disk $m$. Behind the disk $m$ a gear wheel $n$, in connection with this disk is mounted on the shutter casing. This gear wheel $n$ actuates a pinion $o$ under a cover $o^1$, said pinion being mounted on the shutter tensioning device. By the movement of the gear and pinion the usual shutter tensioning device is operated. However the upward movement of the slide bar $l$ is limited by the slots therein and therefore the slide moves up every time to the same height and the shutter is tensioned every time in a uniform manner.

Assuming now that the objective has been completely pushed in and the shutter tensioned then the front door is closed. By the upward movement of the door the toothed segment $q$ mounted on the front door actuates the toothed rack $r$ which in turn moves the pinion $s$. This pinion is loosely mounted upon the shaft $t^1$ of the film moving drum $t$ which is moved when the door is closed by mechanism hereinafter described. The ratchet $u$ formed on the adjoining surface end portion of the drum $t$ is engaged by a pawl $v$ mounted on the extended hub $s^1$ of the pinion $s$ so that the drum moves in but one direction. Thus the pawl $v$ moves the ratchet $u$ of the drum and thereby the drum itself.

At the opposite side of the drum a similar internal ratchet is provided which is engaged by a pawl $w$ pivoted on a sheave-like pulley $x$. A cord or rope $y$ running over this sheave also runs over a similar smaller sheave $z$ of the film spool or reel 1. Thus the reel is moved when the drum is moved by the pinion $s$, the rack $r$ and the toothed segment $q$ during the closing of the door. This is so arranged that one picture length of the film is wound up on the reel at a time. For the purpose of insuring a steady movement of the film the drum $t$ is provided on its outer end portions with fine pins 2, 3, for drawing the film along and preventing slipping. Film guiding rollers 4, 5 are mounted within the camera in the usual manner. By virtue of the pawl and ratchet mechanism the film winding device also can move in but one direction.

A modified form of film moving mechanism is shown in detail in Fig. 4. On the door $a^2$ there is the toothed segment $q$ as before described. This segment engages a pinion 6 which is connected with a gear 7 upon the same shaft. The gear 7 engages the pinion $s$ loosely mounted on the shaft $t^1$ of the film moving drum $t$. By this arrangement a transmission is effected which allows of reducing the diameter of the film moving drum whereby the length of the entire camera is reduced in proportion.

As shown in Fig. 5 the film spool or reel has an extension 8 on the driving side where the sheave $z$ is located. This extension reaches beyond the casing and has on its outer end portion a key 9. By means of the key the protective end portions of the film may be wound upon the reel independent from the film moving drum and the mechanism in connection therewith or, if desired, a film portion of a picture length may be wound thereby.

Under certain circumstances it may be desirable to close the door without taking a picture for instance when a moving object disappears too quickly. In order to prevent the movement of the film the rack $r$ shown in Fig. 3 is moved out of connection with the toothed segment $q$, for instance by means of the lever 10 passing through the camera casing. Likewise the pinion, connected to the gear 7, may be moved out of engagement with the toothed segment $q$ by similar mechanism. In order to maintain the adjustment when this mechanism is released a stop 11 is provided on the wall of the casing and the rack $r$ has a shoulder 12 then resting upon the said stop or a tooth 13 mounted on the casing engages the gear 7. If the automatic device now works again the original adjustment is maintained.

I claim as my invention:

1. A photographic camera for films comprising means for closing the camera in two operations, and means for setting the camera for the next picture automatically actuated by the two closing operations of the camera, ready for exposure after the camera is opened.

2. A photographic camera for films comprising an objective, a shutter, a front door, and mechanism for placing the camera in condition to take the next picture, automatically operated by the inward movement of the objective and the movements of the front door.

3. A photographic camera for films comprising an objective, a shutter, a front door, and mechanism for setting the camera for the next picture while closing it, automatically operated by the inward movement of the objective for tensioning the shutter and the movement of the closing door for advancing one picture length of the film, ready for exposure after the camera is opened.

4. A photographic camera for films comprising an objective, a shutter, a front door, mechanism for setting the camera automatically for the next picture while closing it composed essentially of a slide with nose raised by the inward movement of the objective whereby the shutter is tensioned, and means for advancing one picture length of film actuated by the movement of the closing front door, ready for exposure after the camera is opened.

5. A photographic camera for films comprising an objective, a shutter, a front door, a shutter tensioning mechanism automatically operated by the inward movement of the objective and composed essentially of a slide with nose raised by the inward movement of the objective, a gear with disk and extension moved up by the nose of the rising slide, and a pinion engaged by the gear, and means for moving one picture length of film by the movement of the closing front door.

6. A photographic camera for films comprising an objective, a shutter, a front door, a shutter tensioning mechanism automatically operated by the inward movement of the objective and composed essentially of a slide with nose raised by the inward movement of the objective, a toothed segment on the front door, means operated thereby, comprising a pinion, and film moving mechanism operated by the pinion.

7. In a photographic camera, a front door, means for automatically moving the film one picture length by the movement of the door comprising a toothed segment on the door, means operated thereby comprising a pinion, and a film moving drum on the same shaft with the pinion.

8. In a photographic camera, a door, means for automatically moving the film one picture length by the movement of the door comprising a toothed segment on the door, means operated thereby comprising a pinion, a film moving drum on the same shaft with the pinion, a sheave on the drum, a reel with sheave, and means for transmitting the motion from the drum to the reel.

9. In a photographic camera for films, a film, a front door, moving drum, means for actuating the drum automatically by the movement of the front door comprising a pinion on the shaft of the drum, an extended hub on said pinion, a pawl on the extension, and an internal ratchet formed at the adjoining end of the drum and engaged by the pawl so as to allow of the movement of the drum in but one direction.

10. In a photographic camera for films, means for closing the camera in two operations, mechanism for setting the camera automatically for the next picture by the two closing operations of the camera, means for releasing said mechanism, and means for maintaining the released mechanism in its adjusted position, ready for exposure after the camera is opened.

11. In a photographic camera for films, means for closing the camera in two operations, mechanism for setting the camera automatically for the next picture by the two closing operations of the camera, means for releasing said mechanism, and a stop for maintaining the released mechanism in its adjusted position, ready for exposure after the camera is opened.

12. A photographic camera for films, comprising means for automatically opening the camera, and means for automatically setting the camera for the next picture actuated by the closing operations of the camera, ready for exposure after the camera is opened.

13. A photographic camera for films, comprising an objective, a front door, means for automatically opening the camera, and mechanism for placing the camera in condition to take the next picture, automatically operated by the inward movement of the objective and the movements of the front door.

14. A photographic camera for films, comprising an objective, a shutter, a front door, means for automatically opening the camera, and mechanism for setting the camera for the next picture while closing it, automatically operated by the inward movement of the objective for tensioning the shutter and the movement of the closing door for advancing one picture length of the film, ready for exposure after the camera is opened.

15. A photographic camera for films, comprising an objective, a shutter, a front door, means for automatically opening the camera, and mechanism for setting the camera automatically for the next picture while closing it composed essentially of a slide with nose raised by the inward movement of the objective whereby the shutter is tensioned, and means for advancing one picture length of film actuated by the movement of the closing front door, ready for exposure after the camera is opened.

16. A photographic camera for films, comprising an objective, a shutter, a front door, means for automatically opening the camera, shutter tensioning mechanism automatically operated by the inward movement of the objective and composed essentially of a slide with nose raised by the inward movement of the objective, a gear with disk and extension moved up by the nose of the rising slide, and a pinion engaged by the gear, and means for moving one picture length of film by the movement of the closing front door.

17. A photographic camera for films, comprising an objective, a shutter, a front door, means for automatically opening the camera, shutter tensioning mechanism automatically operated by the inward movement of the objective and composed essentially of a slide with nose raised by the inward movement of the objective, a toothed segment on the front door, means operated thereby, comprising a pinion, and film moving mechanism operated by the pinion.

18. In a photographic camera for films, a front door, means for automatically opening the camera, and means for automatically moving the film one picture length by the movement of the door comprising a toothed segment on the door, means operated thereby comprising a pinion, and a film moving drum on same shaft with the pinion.

19. In a photographic camera for films, a front door, means for automatically opening the camera, means for automatically moving the film one picture length by the movement of the door comprising a toothed segment on the door, means operated thereby comprising a pinion, and a film moving drum on same shaft with the pinion, a sheave on the drum, a reel with sheave, and means for transmitting the motion from the drum to the reel.

20. In a photographic camera for films, a front door, means for automatically opening the camera, a film moving drum, means for actuating the drum automatically by the movement of the front door comprising a pinion on the shaft of the drum, an extended hub on said pinion, a pawl on the extension, and an internal ratchet formed at the adjoining end of the drum and engaged by the pawl so as to allow of the movement of the drum in but one direction.

21. In a photographic camera for films, a front door, means for automatically opening the camera, means for moving the film automatically by the movement of the front door and means for moving the film by hand independently from the automatic device comprising the reel and a key thereon, and means for allowing both the film moving and winding means to turn in but one direction.

22. In a photographic camera for films, means for automatically opening the camera, mechanism for setting the camera automatically for the next picture by the closing operations of the camera, means for releasing said mechanism, and means for maintaining the released mechanism in its adjusted position, ready for exposure after the camera is opened.

23. In a photographic camera for films, means for automatically opening the camera, mechanism for setting the camera automatically for the next picture by the closing operations of the camera, means for releasing said mechanism, and a stop for maintaining the released mechanism in its adjusted position, ready for exposure after the camera is opened.

24. In a photographic camera for films, a front door, means for automatically opening the camera, and means for moving the film actuated by the closing operation of the front door.

25. In a photographic camera for films, a shutter, means for setting the shutter by pushing it into the camera as first operation, a front door on the camera, and means for moving the film by the closing operation of the front door as second operation.

26. In a photographic camera for films, means for automatically opening the camera, a shutter, means for setting the shutter by pushing it into the camera, a front door on the camera, and means for moving the film by the closing operation of the front door.

27. In a photographic camera for films, a shutter, means for first automatically setting the shutter, a front door on the camera, and means for moving the film automatically, after the shutter has been set, by the closing operation of the front door.

28. In a photographic camera for films, means for automatically opening the camera, a shutter, means for first automatically setting the shutter, a front door on the camera, and means for moving the film automatically, after the shutter has been set, by the closing operation of the front door.

29. In a photographic camera for films, separate means for automatically setting the shutter and automatically moving the film actuated by the closing operations of the camera.

30. In a photographic camera for films, means for automatically opening the camera, and separate means for automatically setting the shutter and automatically moving the film actuated by the closing operations of the camera.

31. A folding camera for films, comprising an objective, automatic means for placing the objective in position for exposure of a portion of the film, and means for moving a fresh portion of the film into the field of exposure actuated automatically by the operation of the folding of said camera.

32. A folding camera for films, comprising a setting shutter, an objective, automatically operating means for moving said objective from one inoperative position to one for taking a picture, means actuated by moving said objective in the reverse direction for setting the said shutter, a hinged front door for said camera adapted to support said objective when in the open position and to serve as a protection for said objective within the camera when closed, and means actuated by the operation of said door front to move a fresh portion of the film into position for exposure.

Signed at New York, N. Y., this 21st day of December, 1916.

PAUL DIETZ.

Witnesses:
  LILLEY E. SCHMIDT,
  WILLIAM SÄNGER.